United States Patent
Li et al.

(10) Patent No.: US 12,112,115 B2
(45) Date of Patent: Oct. 8, 2024

(54) ROUTING STRUCTURE AND METHOD OF WAFER SUBSTRATE WITH STANDARD INTEGRATION ZONE FOR INTEGRATION ON-WAFER

(71) Applicant: ZHEJIANG LAB, Zhejiang (CN)

(72) Inventors: Shunbin Li, Hangzhou (CN); Weihao Wang, Hangzhou (CN); Ruyun Zhang, Hangzhou (CN); Qinrang Liu, Hangzhou (CN); Zhiquan Wan, Hangzhou (CN); Jianliang Shen, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/328,800

(22) Filed: Jun. 5, 2023

(65) Prior Publication Data

US 2024/0012977 A1 Jan. 11, 2024

(30) Foreign Application Priority Data

Jul. 8, 2022 (CN) .......................... 202210796930.7

(51) Int. Cl.
*G06F 30/396* (2020.01)
*G06F 115/02* (2020.01)
(Continued)

(52) U.S. Cl.
CPC ........ *G06F 30/396* (2020.01); *H01L 27/0207* (2013.01); *G06F 2115/02* (2020.01); *G06F 2119/22* (2020.01)

(58) Field of Classification Search
CPC ............... G06F 30/396; G06F 2115/02; G06F 2119/22; H01L 27/0207
See application file for complete search history.

(56) References Cited

U.S. PATENT DOCUMENTS

| 6,486,528 B1 | 11/2002 | Pedersen et al. |
| 2008/0143379 A1 | 6/2008 | Norman |

(Continued)

FOREIGN PATENT DOCUMENTS

| CN | 1942046 A | 4/2007 |
| CN | 103413796 A | 11/2013 |

(Continued)

OTHER PUBLICATIONS

Notice Of Allowance(CN202210796930.7); Date of Mailing: Aug. 22, 2022.

*Primary Examiner* — Jack Chiang
*Assistant Examiner* — Aric Lin
(74) *Attorney, Agent, or Firm* — W&G Law Group

(57) ABSTRACT

A routing structure and a method of a wafer substrate with standard integration zone for integration on-wafer, which comprises a core voltage network, an interconnection signal network, a clock signal network and a ground network, wherein the core voltage network and the interconnection signal network belong to a top metal layer, the clock signal network is located in a inner metal layer, and the ground network is located in a bottom metal layer. The pins provided on the standard zone include core voltage pins, interconnection signal pins, clock signal pins, ground pins, and complex function pins. The complex function pins are directly connected to the outside of the system by TSV at the bottom of the wafer, and the other pins are connected by their signal networks. The present disclosure solves the yield problem with few metal layers of the wafer substrate for SoW.

10 Claims, 10 Drawing Sheets

(51) Int. Cl.
*G06F 119/22* (2020.01)
*H01L 27/02* (2006.01)

(56) References Cited

U.S. PATENT DOCUMENTS

| | | |
|---|---|---|
| 2016/0055290 A1 | 2/2016 | Weng |
| 2016/0143140 A1 | 5/2016 | Chang et al. |
| 2017/0294448 A1 | 10/2017 | Debacker et al. |

FOREIGN PATENT DOCUMENTS

| | | |
|---|---|---|
| CN | 103678771 A | 3/2014 |
| CN | 111123065 A | 5/2020 |
| CN | 112736063 A | 4/2021 |
| CN | 215266279 U | 12/2021 |

ROUTING STRUCTURE AND METHOD OF WAFER SUBSTRATE WITH STANDARD INTEGRATION ZONE FOR INTEGRATION ON-WAFER

CROSS-REFERENCE TO RELATED APPLICATIONS

The present application claims priority to Chinese Patent Application No. 202210796930.7, filed on Jul. 8, 2022, the content of which is incorporated herein by reference in its entirety.

TECHNICAL FIELD

The present disclosure relates to the technical fields of micro-nano processing, redistribution layer (RDL) and on-chip integration, in particular to a routing structure and method of a wafer substrate standard integration zone for integration on-wafer.

BACKGROUND OF THE INVENTION

With Moore's law hitting the bottleneck of scaling-down in size, the improvement of computing performance by advanced node obviously slowed down, while data of Internet of Everything has exploded exponentially, and the huge gap between data size and computing power has become wider and wider. Integrated circuit industry is stepping a new post-Moore era.

As Moore's-Law economics and performance are evidently plateauing, System on Wafer (SoW), a new integration method for more than Moore, has attracted the attention of academia and industry. It means to directly attach the bare die to the wafer substrate with metal traces, so as to shrink the interconnection space between chips, narrow the width and pitch of interconnection, and improve the connection bandwidth of the system. Compared with the traditional packaged chips assembled on PCB, the integration density of SoW is much higher than PCB about thousands times.

However, different from the traditional PCB integration, wafer substrate routing is not that flexible due to back end of line (BEOL) process, and also constrained by stepper lithograph, and faces huge yield problem. In the chip fabrication, mask/die size is designed tiny to achieve high yield of full wafer. Therefore, constrained by the semiconductor process, the network on wafer substrate must be stitched by repeated standard lithograph mask. Besides, chip yield exponentially declines by the metal layer increase, which will severely hit the connection ratio of networks on wafer. Therefore, how to generate a reasonable routing network with few metal layers in the standard mask zones of wafer substrate becomes a key technical challenge.

SUMMARY OF THE INVENTION

In order to solve the shortcomings of the prior art, the present disclosure realizes the purpose of improving the yield and connection ratio of wafer routing networks by a three-layer routing method with standard integration zones. The present disclosure adopts the following technical solution.

A routing structure of a wafer substrate standard integration zone for integration on-wafer. In an embodiment, the wafer substrate is divided into several areas as standard integration zones; the standard integration zones are provided with pins upwards, and an on-chip routing network is constructed by connecting the pins. In an embodiment, each standard integration zone includes three metal layers; a top metal layer includes core voltage pins, interconnection signal pins and complex function pins, an inner metal layer includes clock signal pins, and a bottom metal layer includes ground pins.

The core voltage pins are connected to construct a core voltage network for acquiring the core voltage power supply.

The interconnection signal pins distributed in different standard integration zones are connected to construct an interconnection signal network to provide interconnection channels for different standard integration zones.

The standard integration zones are separately communicated with external signals by the complex function pins for complex functions.

The clock signal pins are connected to construct a clock signal network.

The ground pins are connected to construct a ground network.

Further, the standard integration zones are closely arranged by squares on the wafer substrate; in the top metal layer according to the matched pins by taking a core voltage zone as center and providing diagonal interconnection signal zones at four corners, parallel interconnection signal zones at four sides, and complex functional zones located between the diagonal interconnection signal zones and the parallel interconnection signal zones according to the principle of central symmetry.

The core voltage zone is provided with the core voltage pins for acquiring the core voltage power supply, which accounts for ¼ standard integration zone.

The diagonal interconnection signal zones are provided with the interconnection signal pins to provide configurable interconnection channels for diagonal standard integration zones, and each zone accounts for ⅙ standard integration zone.

The parallel interconnection signal zones are provided with the interconnection signal pins to provide high-density and high-speed parallel interconnection channels for adjacent standard integration zones, and the length thereof is ½ that of the standard integration zone.

The complex functional zone is connected to the core voltage zone, and the provided complex functional pins are directly connected with the external signals by through silicon via (TSV), to meet the complex functions of system testing, multi-domain power supply and the like.

Further, the core voltage network and/or the ground network extend in a pound sign (#) shape around the core voltage zone, so that the core voltage network and/or the ground network can cover the whole standard integrated zone, thereby reducing the DC voltage drop in the chip zone and enabling the chip to obtain a power supply balance.

Further, the interconnection signal pins of the diagonal interconnection signal zones are connected in series in an L shape to form a diagonal interconnection signal network, and two pairs of pins on a routing network are selected to form a high-speed differential signal pair with equal distances, so as to meet the signal quality requirement of high-speed signal transmission.

Further, the clock signal network is arranged around the corresponding core voltage zone to reduce the number of routing layers and improve the manufacturing yield.

Further, the size of the standard integration zone is smaller than a maximum size of a corresponding integrated circuit process photomask, so as to meet the standard semiconductor manufacturing process.

Further, the complex functional pins are also scattered throughout the standard integration zone, for the extra test and configuration, which can fully utilize the substrate space.

Further, the networks composed of the core voltage pins and/or the ground pins are arranged in a striped staggered manner to form the shortest return current.

A routing method of a wafer substrate standard integration zone for integration on-wafer includes the following steps.

S1, dividing a wafer substrate into several standard integration zones.

S2, defining the pin distribution on standard integration zones, including core voltage pins, interconnection signal pins, complex function pins, clock signal pins and ground pins.

S3, constructing an on-wafer routing network by connecting the pins, and generating a photolithograph mask of three metal layers.

S3.1, generating the routing of a core voltage network on a top metal layer by the core voltage pins according to a gridding principle to obtain a core voltage power supply; generating the routing of an interconnection signal network according to a non-interleaving principle by the interconnection signal pins; separately linking the standard integration zones with external signals by the complex function pins for complex functions.

S3.2, generating a clock signal network on an inner metal layer by the clock signal pins.

S3.3, generating a ground network on a bottom metal layer by the ground pins according to the gridding principle.

S4, defining fan-out coordinates of TSV of each routing network for connecting with the wafer substrate.

S5, generating an interconnection signal network by the interconnection signal pins of different standard integration zones to provide interconnection channels for different standard integration zones.

Further, in step S4, a principle for the definition comprises: selecting the coordinates of the core voltage pins which the inner metal layer and the bottom metal layer have not passed through as connection points of the core voltage network to the fan-out TSV; selecting the coordinates of clock signal pins which the bottom metal layer has not passed through as connection points of the clock signal network for the fan-out TSVs; selecting the coordinates of the ground pins as the connection points of the ground network for the fan-out TSVs; and directly connecting the complex pins with the TSVs for fan-out.

The present disclosure has the following advantages and beneficial effects.

According to the present disclosure, the pin distribution covering the functions of core voltage power supply, ground routing, multi-power domain power supply, configuration, clock network and the like can be provided only by three layers of routing, so that the yield of wafer substrates is greatly improved due to the reduction of layers, and the compatibility of integration on-wafer is improved; At the same time, the interconnection routing network according to the present disclosure spans a plurality of standard integration zones, and the whole wafer system is built into a developed interconnection network through the interconnection signal lanes of the standard integration zones, which can flexibly support large-scale chiplet interconnection on wafer.

Reference signs: 1. Wafer substrate, 2. Standard integration zone, 3. Standard integrated component, 4. Through silicon via, 5. Complex function pin, 6. Interconnection signal pin, 7. Core voltage pin, 8. Core voltage network, 9. Interconnection signal network, 10. Clock pin, 11. Clock network, 12. Ground pin, 13. Ground network, 14. Diagonal interconnection signal zone, 15. Core voltage zone, 16. Parallel interconnection signal zone, 17. Complex function zone.

DETAILED DESCRIPTION OF THE INVENTION

Detailed description will be made of the specific embodiments of the present disclosure with reference to the accompanying drawings. It should be understood that the specific embodiments described here are only used to illustrate and explain the present disclosure, and are not intended to limit the present disclosure.

Figure 1:
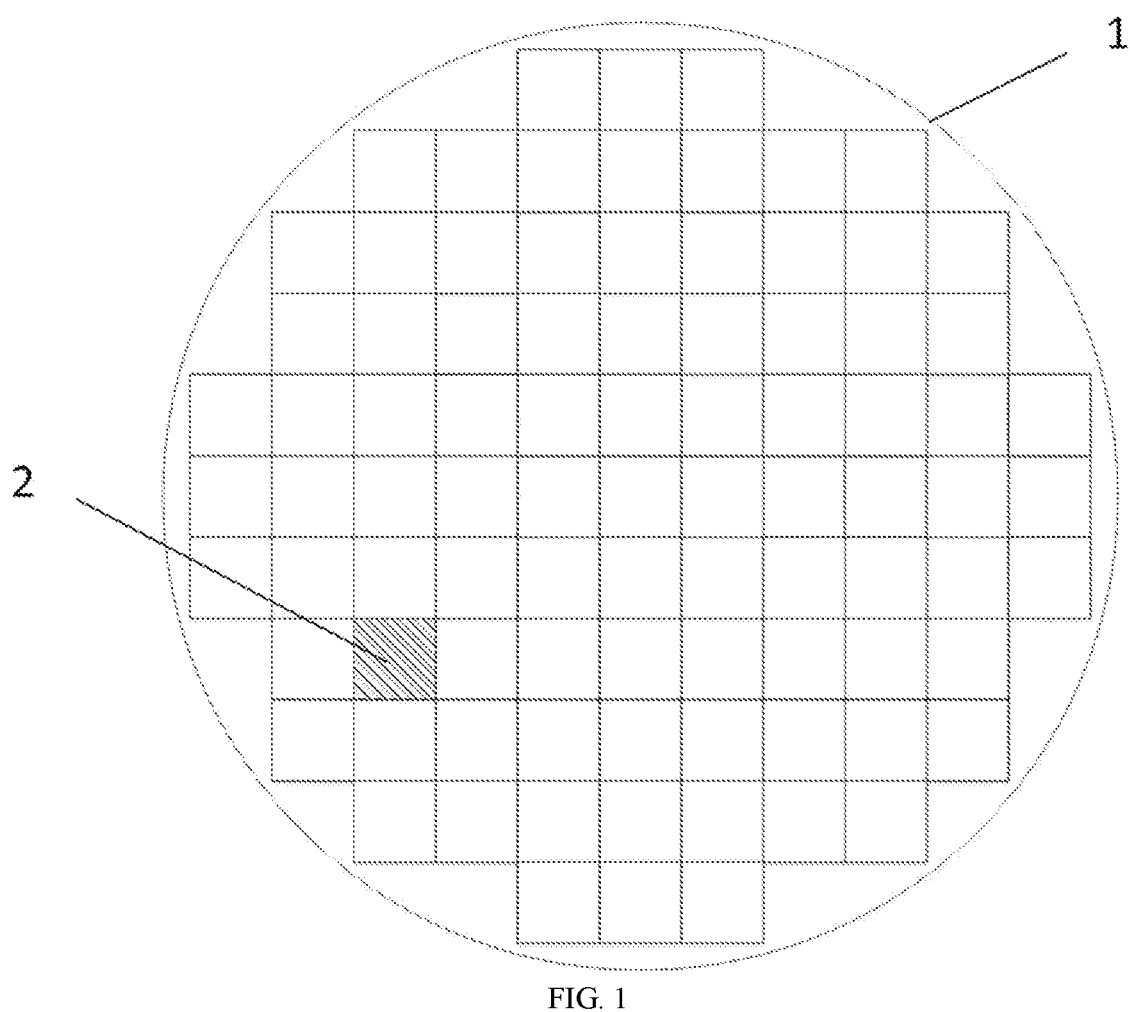
FIG. 1 is a schematic diagram of the distribution of standard integration zones on a wafer substrate of an on-chip integrated system in an embodiment of the present disclosure.
Figure 2:
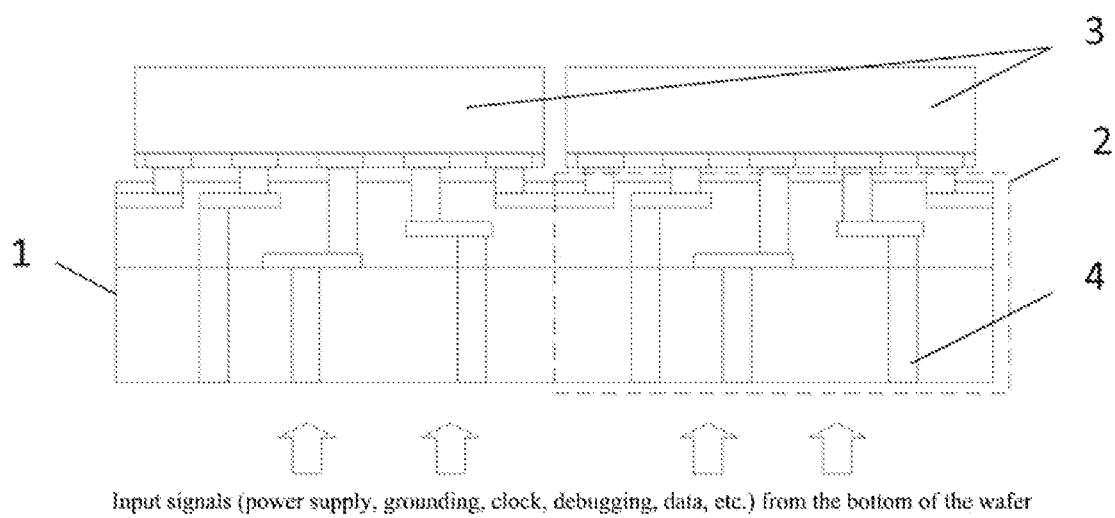
FIG. 2 is a schematic cross-sectional view of the three-dimensional structure of the on-chip integrated system according to an embodiment of the present disclosure.
Figure 3:
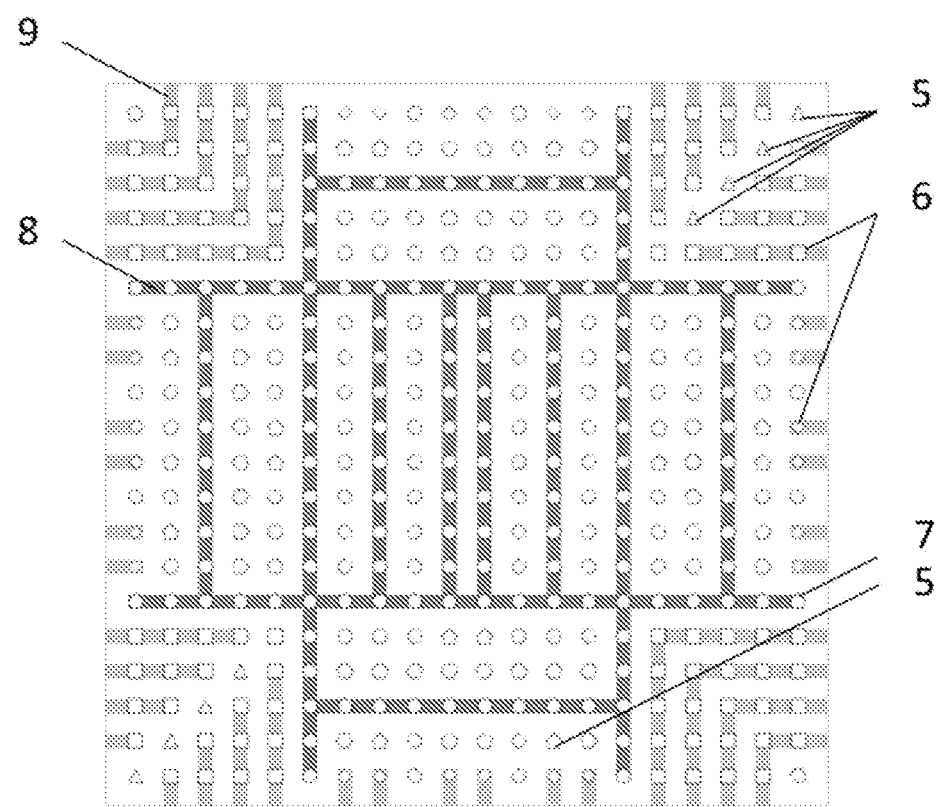
FIG. 3 is a schematic diagram of the routing network of the top metal layer in a standard integration zone according to an embodiment of the present disclosure.
Figure 4:
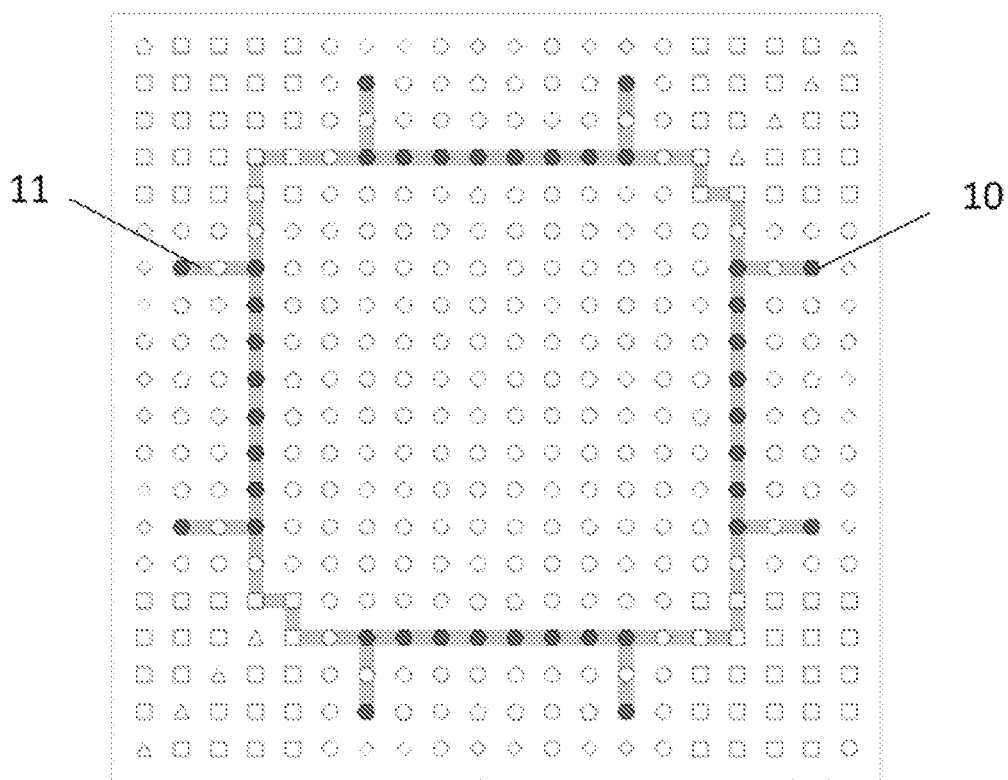
FIG. 4 is a schematic diagram of an inner metal layer routing network in a standard integration zone in an embodiment of the present disclosure.
Figure 5:
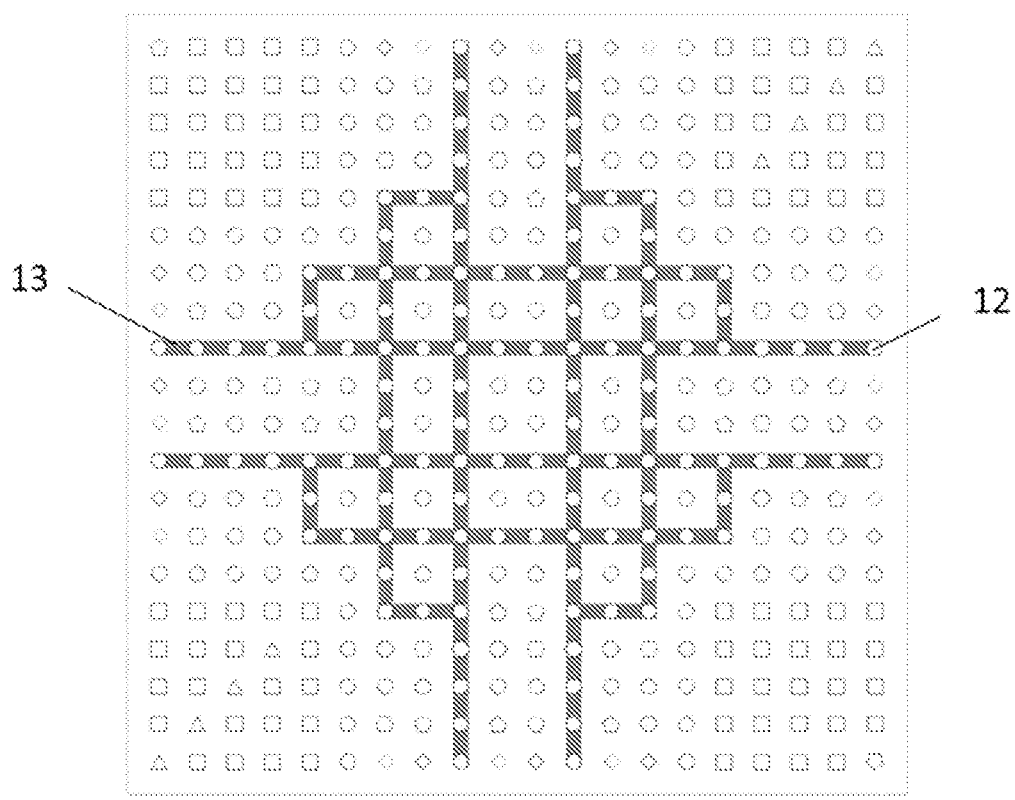
FIG. 5 is a schematic diagram of the routing network of the bottom metal layer in a standard integration zone according to an embodiment of the present disclosure.

As shown in FIGS. 1 and 2, the routing structure of a wafer substrate standard integration zone suitable for on-chip integration is divided into areas on wafer substrate 1 as standard integration zones 2; the standard integration zones 2 are provided with pins upwards, and an on-chip routing network is constructed by connecting the pins. In an embodiment, each standard integration zone includes three metal layers, as shown in FIG. 3 to FIG. 5; a top metal layer includes core voltage pins 7, interconnection signal pins 6 and complex function pins 5, a middle metal layer includes clock signal pins 10, and a bottom metal layer includes ground pins 12.

The core voltage pins 7 are connected to construct a core voltage network 8 for acquiring the core voltage power supply capability.

The interconnection signal pins 6 distributed in different standard integration zones 2 are connected to construct an interconnection signal network 9 to provide interconnection channels for different standard integration zones 2.

The standard integration zones 2 are separately communicated with external signals by the complex function pins 5 for complex functions.

The clock signal pins 10 are connected to construct a clock signal network 13.

The ground pins 12 are connected to construct a ground network 13.

Figure 6:
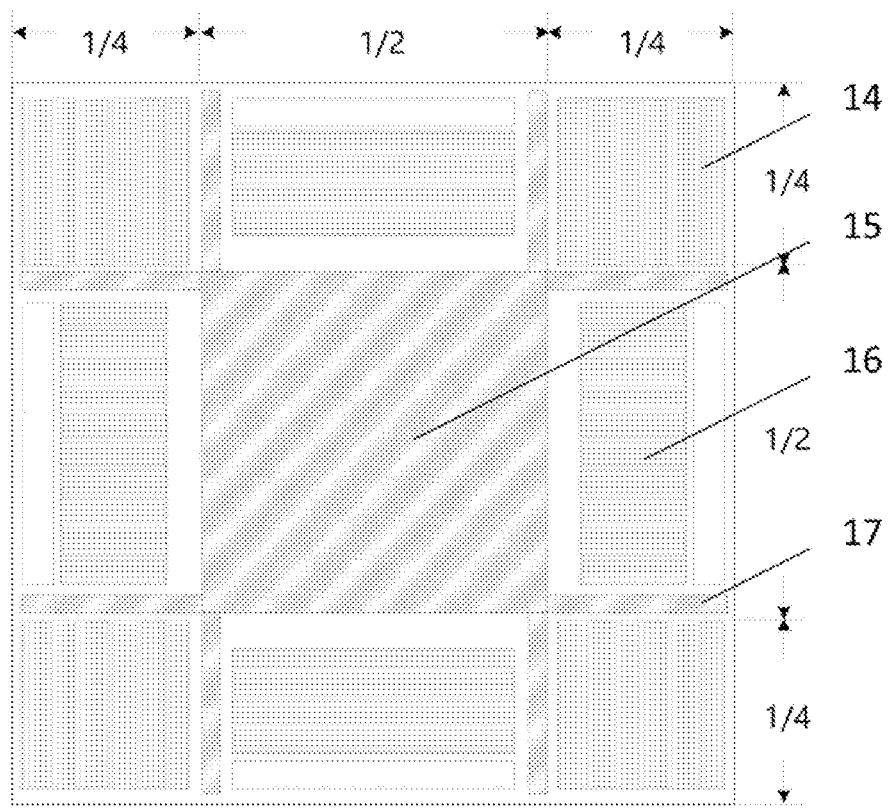
FIG. 6 is a schematic diagram of the division of standard integration zone signal pins according to an embodiment of the present disclosure.

The standard integration zones are closely arranged square zones which are divided on the wafer substrate 1; as shown in FIG. 6, the standard integration zones are divided in the top metal layer according to the matched pins by taking a core voltage zone 15 as a center and providing diagonal interconnection signal zones 14 at four end corners, parallel interconnection signal zones 16 at four sides, and complex functional zones 17 located between the diagonal interconnection signal zones 14 and the parallel interconnection signal zones 16 according to the principle of central symmetry.

The core voltage zone 15 is provided with the core voltage pins for acquiring the core voltage power supply capability, and the zone thereof is ¼ of that of the standard integration zone 2.

The diagonal interconnection signal zones 14 are provided with the interconnection signal pins 6 to provide configurable interconnection channels for diagonal standard integration zones 2, and the zone of each zone is ⅙ of that of the standard integration zone 2.

The parallel interconnection signal zones 16 are provided with the interconnection signal pins 6 to provide high-density high-speed parallel interconnection channels for adjacent standard integration zones 2, and the length thereof is ½ that of the standard integration zone 2.

The complex functional zones 17 are connected with the core voltage zone 15, and the provided complex functional pins 5 are directly connected with the external signals by through silicon vias 4 (TSVs), to meet the complex functions of system testing, multi-domain power supply and the like.

The core voltage network 8 and/or the ground network 13 extend in a #shape around the core voltage zone 15, so that the core voltage network 8 and/or the ground network 13 can cover the whole standard integrated zone 2.

The interconnection signal pins 6 of the diagonal interconnection signal zones 14 are connected in series in an L shape to form a diagonal interconnection signal network, and the signal path spans multiple standard integration zones 2. Two pairs of pins on a routing network are selected to form a high-speed differential signal pair with equal distances.

The clock signal network 11 is arranged around the corresponding core voltage zone 15.

The size of the standard integration zone 2 is smaller than a maximum size of a corresponding integrated circuit process photomask.

The complex functional pins 5 are scattered throughout the standard integration zone after a layout main body is designed, except for complex pin functional zones, so that on the basis of the overall routing network, effective supplements can be provided for the test and configuration requirements.

The networks composed of the core voltage pins 7 and/or the ground pins 12 are arranged in a striped staggered manner.

Figure 7:
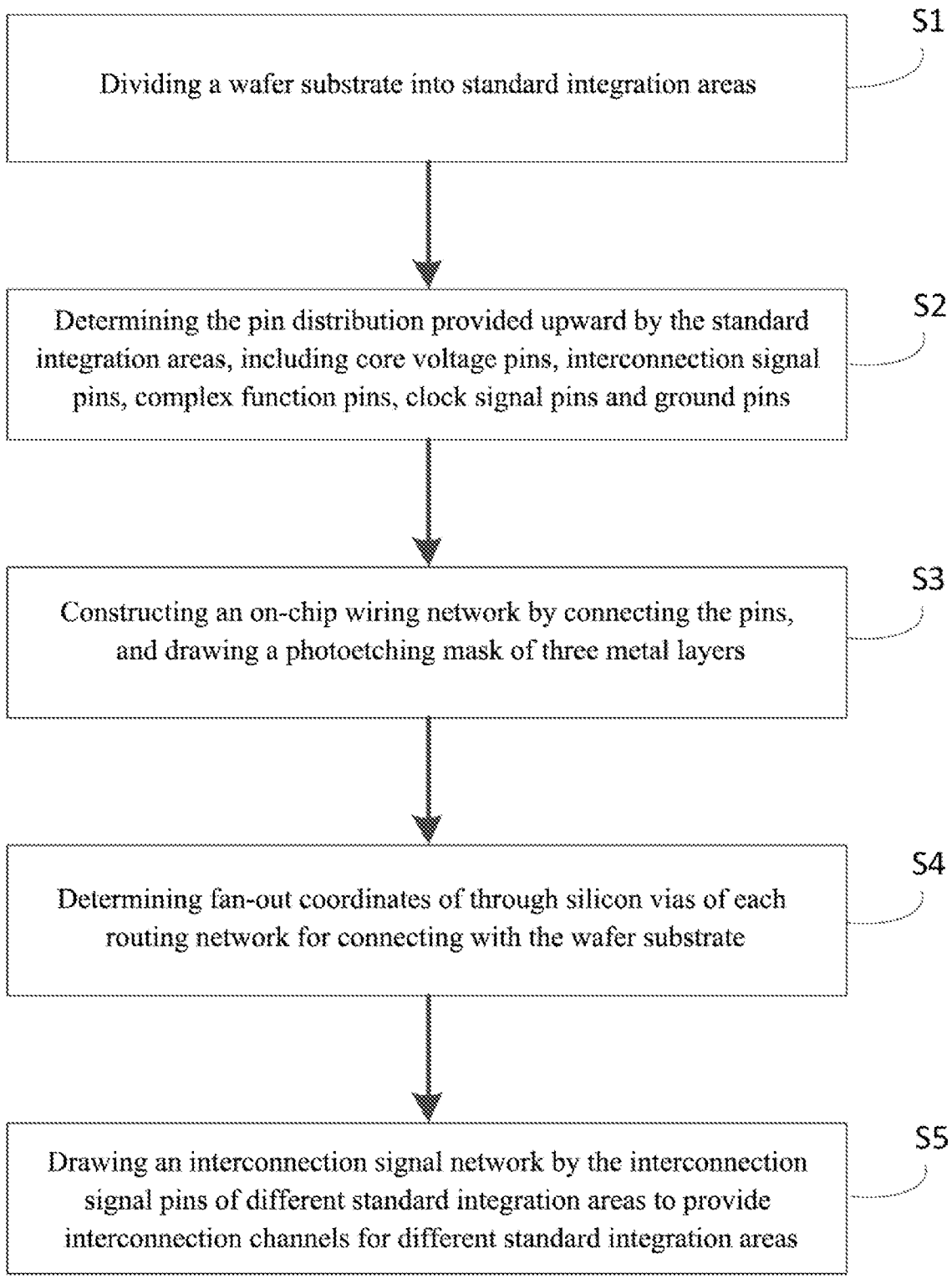
FIG. 7 is a flowchart of a standard integration zone routing method according to an embodiment of the present disclosure.

The routing method of a wafer substrate standard integration zone suitable for on-chip integration, as shown in FIG. 7, includes the following steps.

S1, dividing a wafer substrate into standard integration zones 2.

In an embodiment, a wafer substrate 1 is divided into regularly arranged standard integration areas 2 according to the square area size of 20 mm×20 mm, as shown in FIG. 1. Each standard integration zone 2 on the wafer 1 will be etched with the same lithography mask. The diameter size and pin spacing of the upward growing pins are determined according to the target process. In this embodiment, the pin diameter size is 10 um and the pin spacing is 10 um. In this case, the standard integration zone 2 can support up to 1000 pins per row.

S2, determining the pin distribution provided upward by the standard integration zones 2, including core voltage pins 7, interconnection signal pins 6, complex function pins 5, clock signal pins 10 and ground pins 12.

S2.1, arranging 500×500 core voltage pins 7 and ground pins 12 in the area of 10 mm×10 mm in the center of the standard integration zone 2 in a staggered manner, as shown in FIG. 3. For the convenience of display, one pin point on the FIG. 3 represents 50 actual pins.

S2.2, aligning the core voltage pins 7 in the 10 mm×10 mm area in the center of the standard integration zone 2 and allowing them to extend out to form a #shape network, so that the power supply pins of the core voltage network 8 can cover the whole standard integration zone 2.

S2.3, aligning the ground pins 12 in the 10 mm×10 mm area in the center of the standard integration zone 2 and allowing them to extend out to form a #shape network, so that the ground network 13 can also cover the whole standard integration zone 2.

S2.4, arranging a row of 250 pins is evenly distributed in each parallel interconnection signal zone 16, and the pins in a staggered manner according to the pattern of "core voltage pin-interconnection signal pin-interconnection signal pin-ground pin-interconnection signal pin-interconnection signal pin-core voltage pin", with a total of 2 core voltage pins 7, 82 grounding signal pins and 166 interconnection signal pins 6. In an embodiment, the interconnection signal pins 6 are used to connect two adjacent standard integration zones 2.

S2.5, evenly distributing 250×250 signal pins in the area of 145 mm×5 mm in the diagonal interconnection signal zone, of which a row of pins on the 45° diagonal are set as configuration pins, and the rest are set as diagonal interconnection signal pins to support the L-shaped interconnection signal network 9, as shown in the corresponding upper right corner and lower left corner of FIGS. 3 and 6.

S2.6, arranging complex function pins 5 and clock signal pins 10 in the complex function zone 17 around the 10 mm×10 mm core power supply area, with the ratio of the complex function pins 5 to the clock signal pins 10 being 2:1, as shown in FIG. 6.

S3, constructing an on-chip routing network by connecting the pins, and drawing a photoetching mask of three metal layers.

S3.1, drawing the routing of a core voltage network on a top metal layer by the core voltage pins 7 according to a gridding principle to obtain a core voltage power supply capability; drawing the routing of an interconnection signal network according to a non-interleaving principle by the interconnection signal pins 6; and separately communicating the standard integration zones 2 with external signals by the complex function pins 5 for complex functions, as shown in FIG. 3;

S3.2, drawing a clock signal network 11 on a middle metal layer by the clock signal pins 10, as shown in FIG. 4.

S3.3, drawing a ground network 13 on a bottom metal layer by the ground pins 12 according to the gridding principle, as shown in FIG. 5.

S4, determining fan-out coordinates of TSV 4 of each routing network for connecting with the wafer substrate 1.

Figure 8:
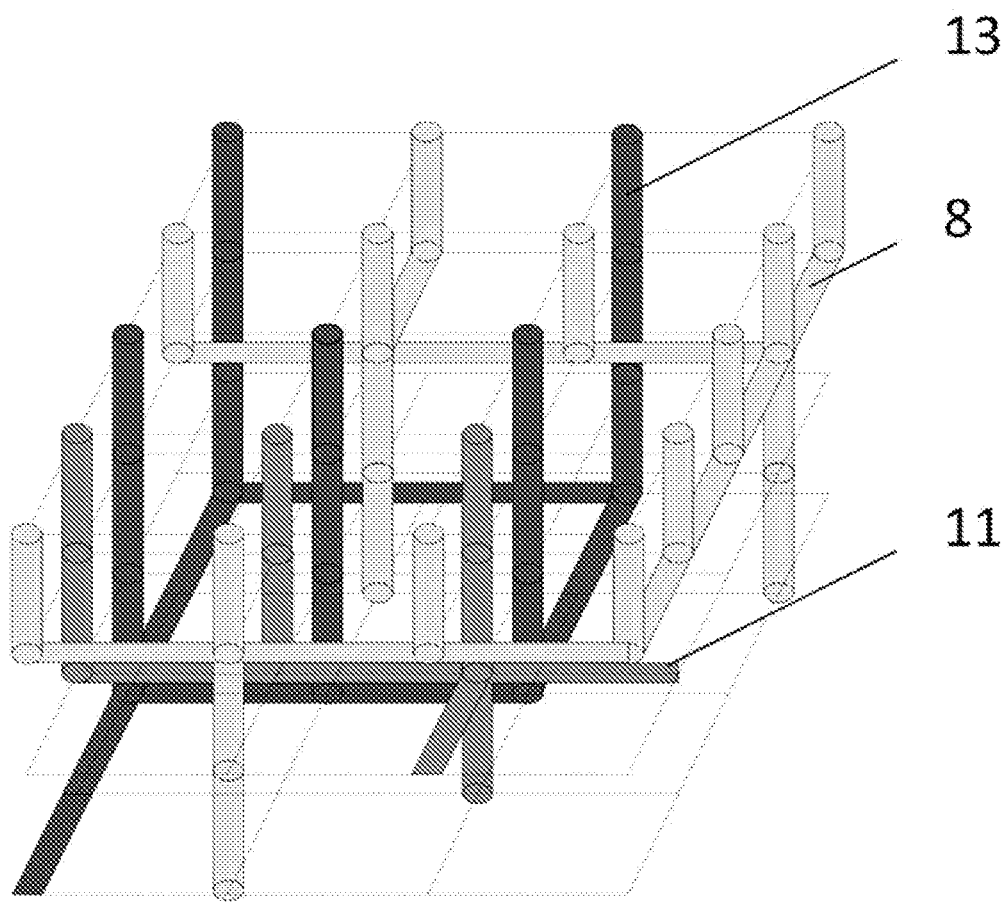
FIG. 8 is a perspective hierarchical diagram of three-layer technology routing in a standard integration zone according to an embodiment of the present disclosure.

The selection principle is as follows: selecting the coordinates of the core voltage pins which the middle metal layer and the bottom metal layer have not passed through as connecting points of the core voltage network 8 to the fan-out of the TSV 4; selecting the coordinates of clock signal pins which the bottom metal layer has not passed through as connecting points of the clock signal network 11 for the fan-out of the 4TSV; selecting the coordinates of the ground pins as the connecting points of the ground network 13 for the fan-out of the TSV 4; and directly connecting the complex pins 5 with the TSV 4 for fan-out; the interconnection signal pins 6 do not need to fan out by the TSV, as shown in FIG. 8.

S5, drawing an interconnection signal network by the interconnection signal pins 6 of different standard integration zones 2 to provide interconnection channels for different standard integration zones 2.

Figure 9A:
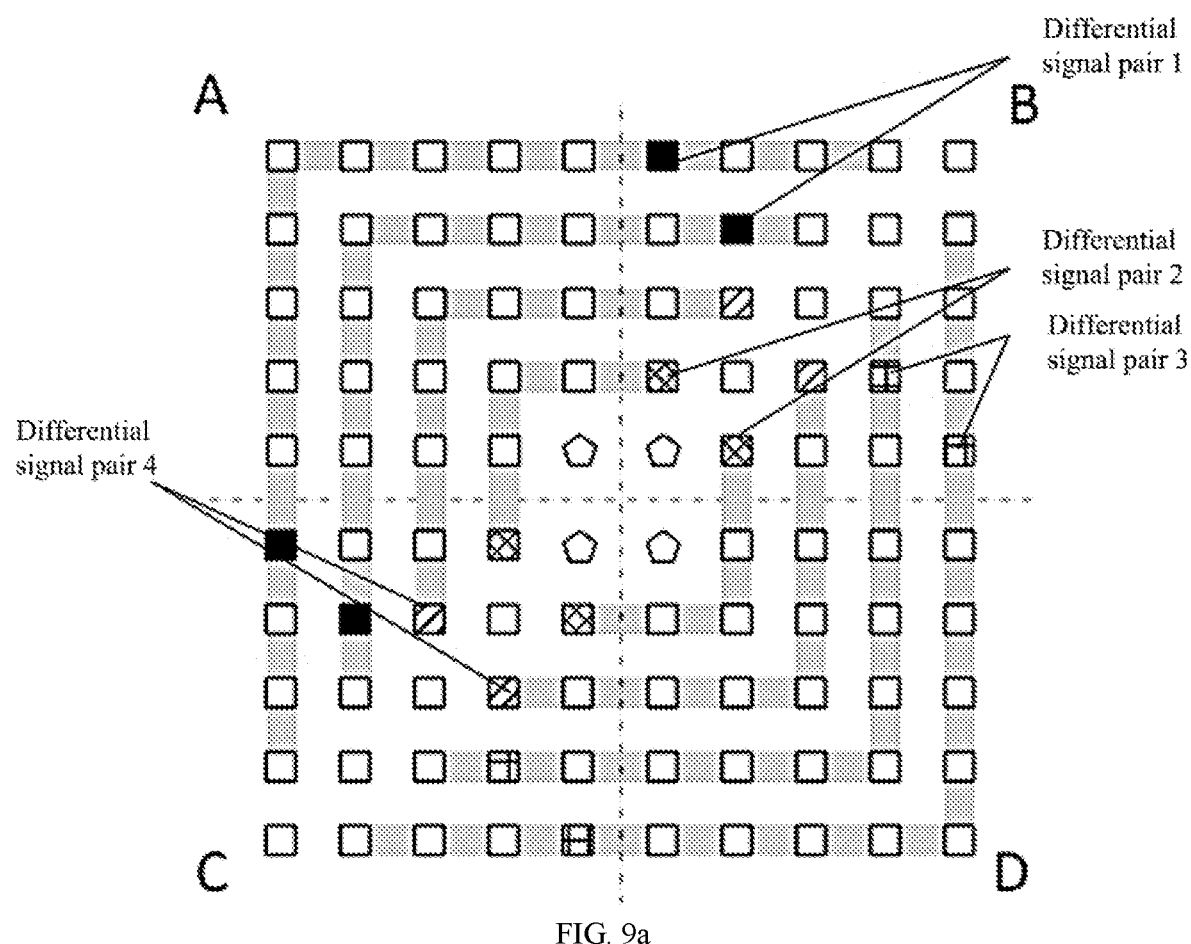
FIG. 9a is a schematic diagram of the path of diagonal standard integration zones connected by diagonal interconnection signal network according to an embodiment of the present disclosure.
Figure 9B:
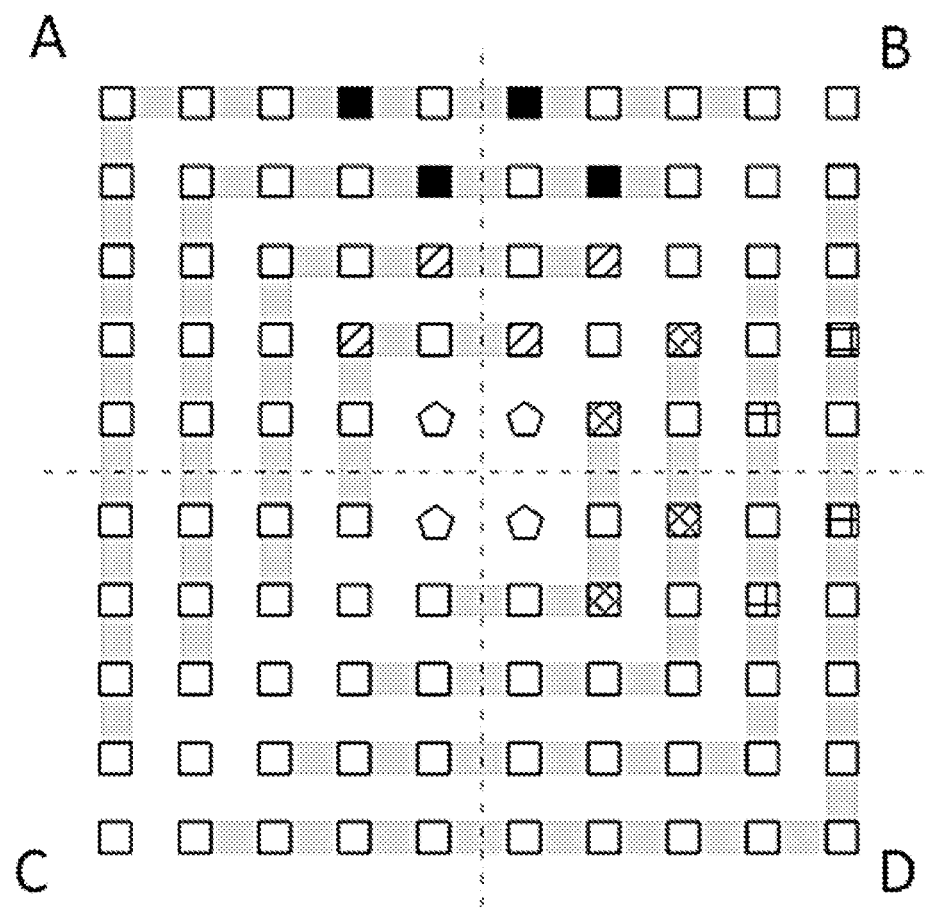
FIG. 9b is a schematic diagram of the paths of adjacent standard integration zones connected by diagonal interconnection signal networks according to an embodiment of the present disclosure.

The purpose of the wafer 1 is to provide a rich and reliable routing network for the standard integrated component 3. After the wafer substrate 1 is prepared, it is not necessary to bond all pins in the hot-press bonding assembly of the standard integrated component 3 and the standard integration zone. As shown in FIG. 9a and FIG. 9b, at the junction of four standard integration zones A, B, C and D, the user can select the diagonal interconnection signal pins on the standard integration zones B and C to form multiple pairs of differential signal pairs by the L-shaped network to complete the signal connection of the standard integrated component 3 on the diagonal standard integration zone, as shown in FIG. 9a. Alternatively, the pins on the standard integration zones A and C can be selected to form a connection network with the pins on the standard integration zone B, so as to strengthen the bandwidth convergence capability of the standard integration zone B, as shown in FIG. 9b.

To sum up, the embodiment of the present disclosure provides a routing structure and method of a wafer substrate standard integration zone suitable for on-chip integration for the first time. Only three metal routing layers are used to provide rich on-chip interconnection routing resources including power supply, grounding, clock, debugging, multiple power domains and the like for standard integrated component 3, which greatly improves the preparation yield of the wafer substrate 1. At the same time, in view of the differential requirements of bandwidth convergence capabilities of different functional zones integrated on the chip, the diagonal interconnection signal network provided by the embodiment of the present disclosure also supports cross-regional connection with flexible configuration.

The above examples are only used to illustrate, rather than to limit the technical solution of the present disclosure; although the present disclosure has been described in detail with reference to the foregoing embodiments, those skilled in the art should understand that it is still possible to modify the technical solutions described in the foregoing embodiments, or to equivalently replace some or all of the technical features thereof; these modifications or substitutions do not make the essence of the corresponding technical solutions depart from the scope of the technical solutions of the embodiments of the present disclosure.

The invention claimed is:

1. A wafer substrate with standard integration zones suitable for on-chip integration, wherein the wafer substrate comprises the standard integration zones, the standard integration zones are provided with pins upwards, an on-chip routing network is constructed by connecting the pins, and the standard integration zones are routed by a semiconductor machine, and wherein each standard integration zone comprises:
   a top metal layer comprising core voltage pins, interconnection signal pins and function pins,
   a middle metal layer comprising clock signal pins, and
   a bottom metal layer comprising ground pins;
   wherein the wafer substrate further comprises a core voltage network, an interconnection signal network, a clock signal network and a ground network;
   wherein the core voltage network is constructed by connecting the core voltage pins and is configured to acquire the core voltage power supply capability;
   wherein the interconnection signal network is constructed by connecting the interconnection signal pins distributed in different standard integration zones and is configured to provide interconnection channels for different standard integration zones;
   wherein the clock signal network is constructed by connecting the clock signal pins;
   wherein the ground network is constructed by connecting the ground pins; and
   wherein the standard integration zones are separately communicated with external signals by the function pins for system testing and multi-domain power supply.

2. The wafer substrate according to claim 1, wherein the standard integration zones are closely arranged square zones which are divided on the wafer substrate, the standard integration zones are divided at the top metal layer according to pins which are matched with each other, and diagonal interconnection signal zones at four end corners, parallel interconnection signal zones at four sides, and functional zones located between the diagonal interconnection signal zones and the parallel interconnection signal zones are provided by taking a core voltage zone as a center according to principle of central symmetry;
   wherein the core voltage zone is provided with the core voltage pins for acquiring the core voltage power supply capability;
   wherein the diagonal interconnection signal zones are provided with the interconnection signal pins for providing configurable interconnection channels for diagonal standard integration zones;
   wherein the parallel interconnection signal zones are provided with the interconnection signal pins for providing high-density high-speed parallel interconnection channels for adjacent standard integration zones; and
   wherein the functional zones are connected with the core voltage zone, and the functional pins are directly connected with the external signals by through silicon vias.

3. The wafer substrate according to claim 2, wherein the core voltage network and/or the ground network extend in a pound sign (#) shape around the core voltage zone.

4. The wafer substrate according to claim 2, wherein the interconnection signal pins of the diagonal interconnection signal zones are connected in series in an L shape to form a diagonal interconnection signal network, and two pairs of pins on a routing network are selected to form a high-speed differential signal pair with equal distances.

5. The wafer substrate according to claim 2, wherein the clock signal network is arranged around a core voltage zone corresponding to the clock signal network.

6. The wafer substrate according to claim 1, wherein a size of the standard integration zone is smaller than a maximum size of an integrated circuit process photomask corresponding to the standard integration zone.

7. The wafer substrate according to claim 1, wherein the functional pins are scattered throughout the standard integration zone after a layout main body is designed, except for pin functional zones.

8. The wafer substrate according to claim 1, wherein networks comprising the core voltage pins and/or the ground pins are arranged in a striped staggered manner.

9. A routing method of standard integration zones of a wafer substrate suitable for on-chip integration, wherein the routing method is implemented by a semiconductor machine and applied in a scenario of directly attaching an unpackaged chip to the wafer substrate, and the routing method comprises following steps:

S1, dividing the wafer substrate into the standard integration zones;

S2, determining pin distribution of the standard integration zones, wherein an orientation of pins of the pin distribution is upward, and the pins comprise core voltage pins, interconnection signal pins, function pins, clock signal pins and ground pins; and S3, constructing an on-chip routing network by connecting the pins, and constructing a photoetching mask of three metal layers, wherein step S3 comprises following three substeps:

S3.1, constructing routing of a core voltage network on a top metal layer by the core voltage pins according to a gridding principle to obtain a core voltage power supply capability; constructing routing of an interconnection signal network according to a non-interleaving principle by the interconnection signal pins; separately communicating the standard integration zones with external signals by the function pins for system testing and multi-domain power supply;

S3.2, constructing a clock signal network on a middle metal layer by the clock signal pins; and S3.3, constructing a ground network on a bottom metal layer by the ground pins according to the gridding principle;

S4, determining fan-out coordinates of through silicon vias of each routing network for connecting with the wafer substrate;

S5, constructing an interconnection signal network by the interconnection signal pins of different standard integration zones to provide interconnection channels for different standard integration zones; and S6, providing the standard integration zones of the wafer substrate to the unpackaged chip to achieve an attachment between the unpackaged chip and the on-chip routing network.

10. The routing method according to claim 9, wherein, in step S4, a principle for the determination comprises: taking coordinates of the core voltage pins which the middle metal layer and the bottom metal layer have not passed through as connecting points, relative to the through silicon vias, of pins of the core voltage network for fan-out; taking coordinates of clock signal pins which the bottom metal layer has not passed through as connecting points, relative to through silicon holes, of pins of the clock signal network for fan-out; taking coordinates of the ground pins as the connecting points, relative the through silicon vias, of pins of the ground network for fan-out; and connecting the function pins with the through silicon holes for fan-out.

\* \* \* \* \*